Oct. 29, 1940.  C. T. DOMAN ET AL  2,219,516
AIR COOLING SYSTEM FOR INTERNAL COMBUSTION ENGINES
Filed April 14, 1937  3 Sheets-Sheet 3
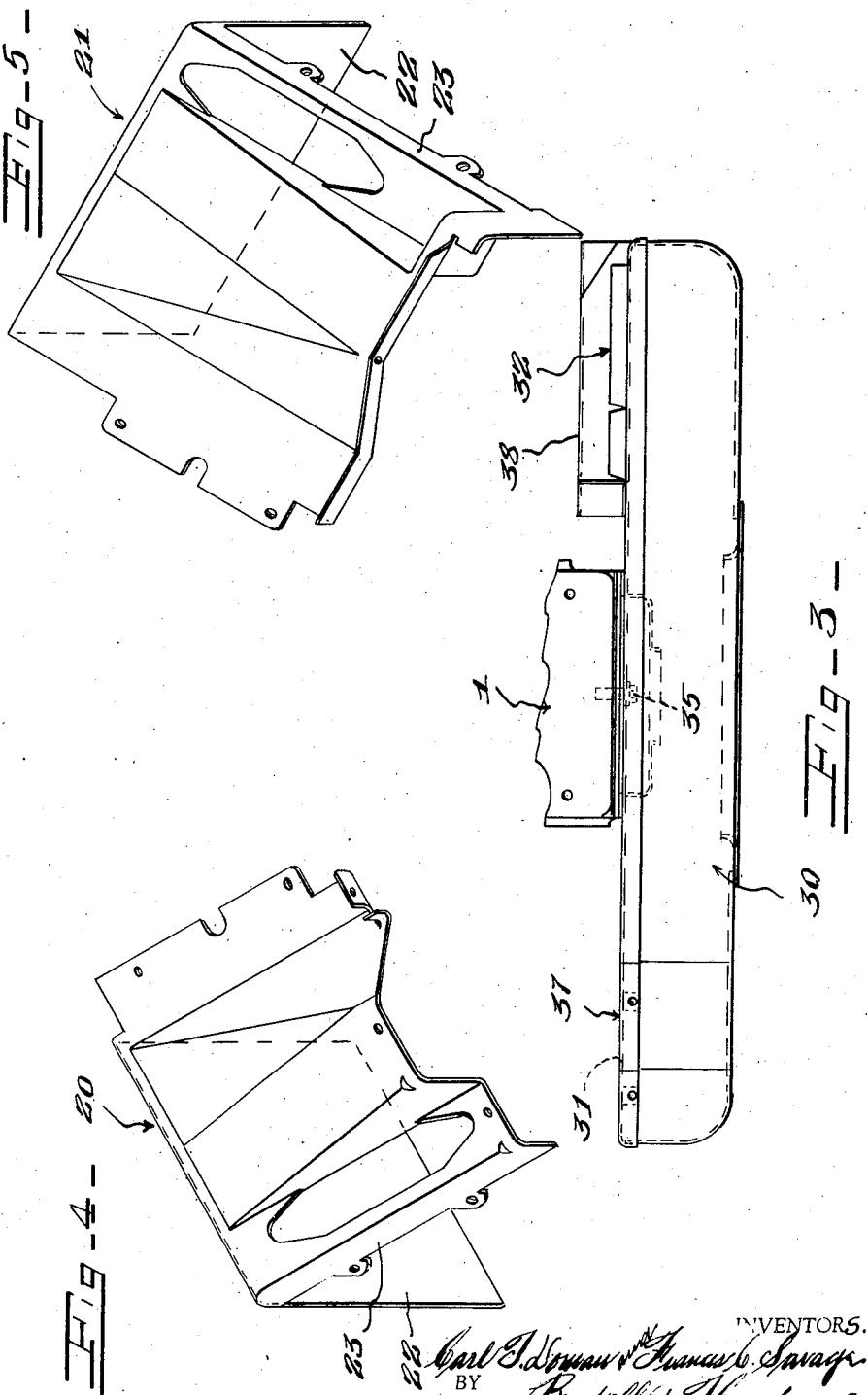

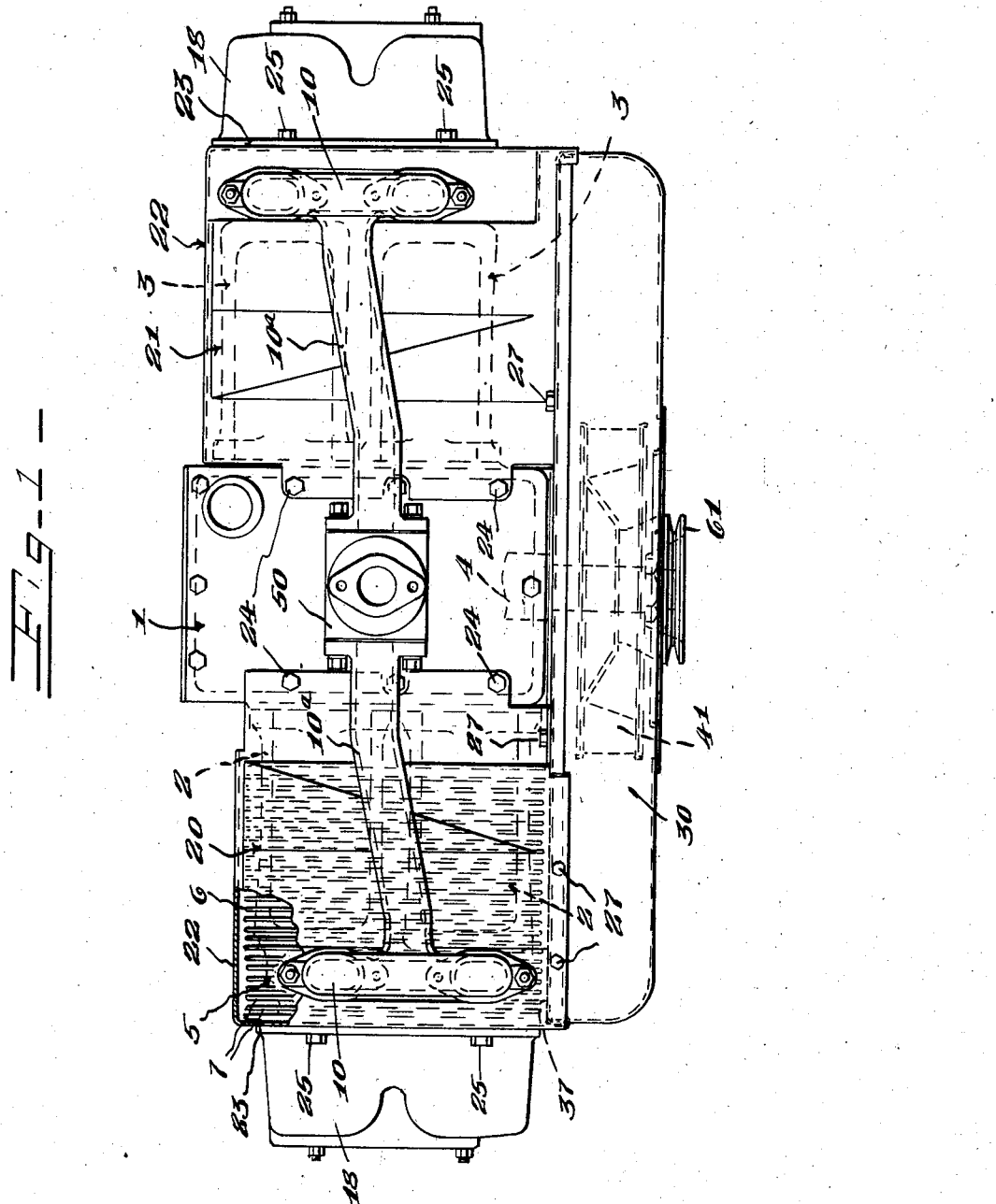

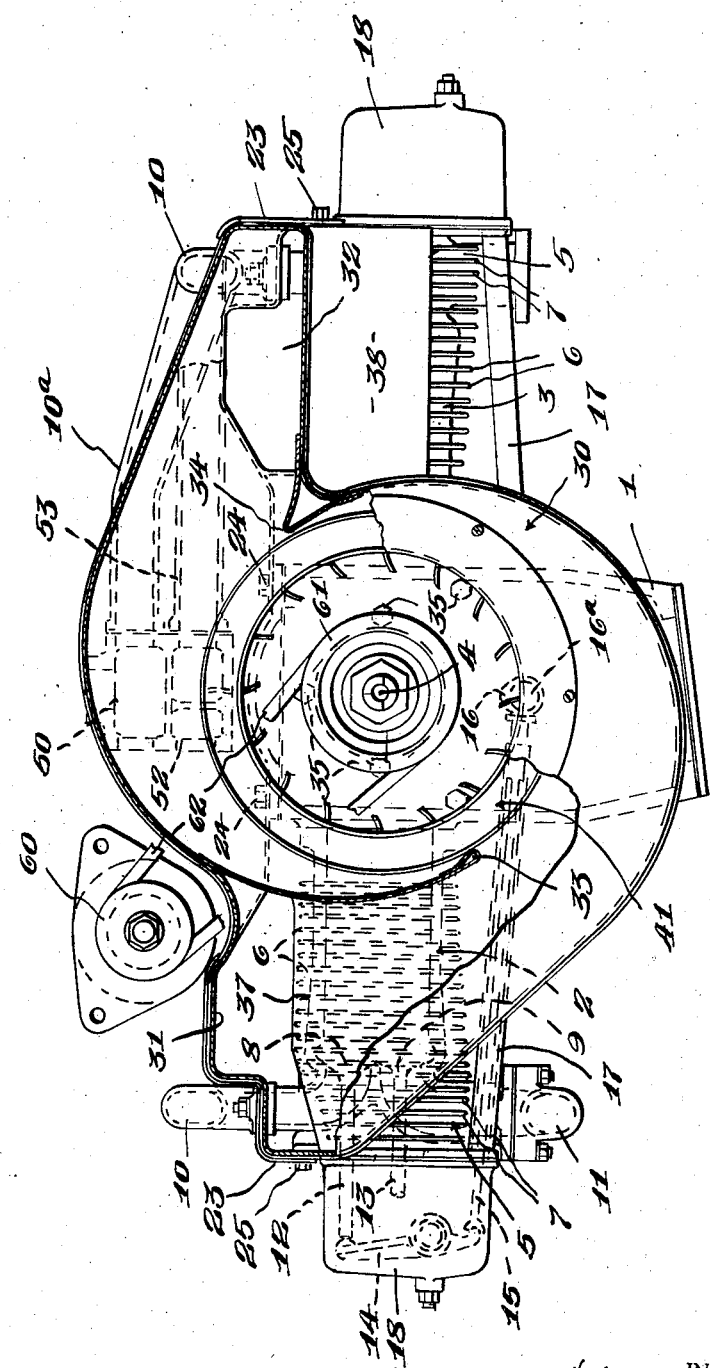

Patented Oct. 29, 1940

2,219,516

UNITED STATES PATENT OFFICE 2,219,516

AIR COOLING SYSTEM FOR INTERNAL COMBUSTION ENGINES

Carl T. Doman, Geddes, and Francis C. Savage, Syracuse, N. Y., assignors to Aircooled Motors Corporation, a corporation of New York Application April 14, 1937, Serial No. 136,854

1 Claim. (Cl. 123—171)

This invention relates to air cooled internal combustion engines, and has for its object a particularly simple air cooling system for an engine in which the cylinders are opposed to each other, or in which the cylinders are horizontally opposed, and an air cooling system in which the air conduits and fan and fan casing are assembled on the engine in a particularly simple and compact manner, and the air conduits readily removable for giving access to the engine, and replaceable.

More specifically, it has for its object an air cooling system for an engine in which the cylinders extend in opposite directions from the crank case or an engine in which the cylinders are horizontally opposed to each other, consisting of air conduits or boxes enclosing the banks of cylinders, one box for each bank, and each box being open at one side toward the bank, for the outlet of the air, together with means creating air currents through the boxes or for supplying air under pressure thereto.

The invention consists in the novel features and in the combinations and constructions hereinafter set forth and claimed.

In describing this invention, reference is had to the accompanying drawings in which like characters designate corresponding parts in all the views.

Figure 1 is a plan view of an engine embodying this air cooling system.

Figure 2 is a front elevation, partly in section.

Figure 3 is a plan view of the fan casing, the contiguous part of the crank case being also shown.

Figures 4 and 5 are isometric views of the removable top walls of the air conduits.

1 designates the crank case of the engine. 2 and 3 designate banks of cylinders extending in opposite directions from the crank case 1, these usually extending horizontally in opposite directions. 4 designates the crank shaft. The pistons, which work in the cylinders, are connected to the cranks of the crank shaft by connecting rods in any well known manner. The barrels of the cylinders, as well as the heads 5 thereof are provided with circumferentially extending heat radiating fins 6, 7. The engine here shown is of the valve-in-the-head type.

8 and 9 designate respectively the intake and exhaust valves, and 10 and 11, the intake and exhaust manifolds. The valves have stems 12, 13 guided in the heads and operated by suitable valve mechanism, as rocker arms 14 with which coact push rods, as 15, coacting with cams 16 on the cam shaft 16a in the crank case. The push rods extend through tubes 17 located below the banks of cylinders. The overhead valve mechanism is enclosed in a suitable cap or housing 18. The valve mechanism forms no part of this invention. The engine is equipped with a suitable full pressure oiling system, which also forms no part of this invention.

The air cooling system comprises boxes or conduits 20, 21 extending above the upper sides of the banks of cylinders 2, 3 and the full length of the cylinders, including the barrels and the heads, the boxes or conduits being open at their lower sides to discharge air downwardly against the cylinders, between the same and also around the same, a fan casing having two outlets communicating with the front ends of the boxes above the banks of cylinders, and a rotor or fan in the fan casing. Each box, in addition to its top wall, has rear end walls 22, and an outer end wall 23 extending partway over the heads of the cylinders of the bank. The top wall is detachably secured at its inner margin to the crank casing, as by bolts 24, and the outer walls 23 are detachably secured to the heads, in a similar manner, as by bolts 25. The front end of each box is detachably secured to the fan housing, as by screw bolts 27. Thus, the boxes or conduits are readily removable by removing the bolts 24, 25, and the screws 27.

30 designates the fan housing, this having two outlets 31 and 32 and being of the double scroll type having two diametrically disposed air pick-off ledges 33 and 34. The outlet 31 communicates with the front end of the conduit or box 20 and the outlet 32, with the front end of the conduit or box 21. The fan housing is secured to the crank casing, as by bolts 35 extending into the front end of the crank case through openings in the fan housing. The fan housing is also provided with a shield plate 38 depending from outlet 32 in front of the cylinders of the banks, adjacent the bank or pair of cylinders and closes up the front side of the box 21. The wall 37 of the fan housing below the outlet 31 closes the front side of the box 20.

41 designates a fan or blower within the double scroll casing, this being usually mounted on the crank shaft 4 of the engine.

50 designates a box or casing on which the carburetor is mounted and to which the main branches 10a of the intake manifolds 10 are connected, this box or casing 50 being here shown as provided with a jacket 52 which is suitably connected, as by a pipe 53, to one of the exhaust manifolds 11 to receive hot exhaust gases therefrom for heating the incoming gas or vapor from the carburetor.

60 designates a pulley of a generator, which pulley is connected with a second pulley 61 on the crank shaft, by a belt 62.

In operation, while the engine is running, the fan rotor 41 takes in air through the center thereof and throws it centrifugally outward in the double scroll casing through the outlets 31, 32 into their boxes or conduits 2, 3 from whence it is discharged downwardly against the upper sides of the cylinders and through the passages between the cylinders and around the outer sides of the cylinders, to the lower side of the engine on opposite sides of the crank case.

The air cooling system, including the fan housing and the conduits, is readily applied to the engine, and the air conduits or boxes are readily removable for giving access to the engine. Also, the air currents created by the fan is distributed between the two banks of cylinders and directed by the air conduits against, between and around the cylinders to adequately and uniformly cool the same.

What we claim is:

The combination with an internal combustion engine which includes a crank case, crank shaft journalled therein, and banks of cylinders extending horizontally in opposite directions from the crank case; of an air cooling system including boxes individual to the banks of cylinders and located in horizontal position on the upper sides of the banks respectively and being open at their lower sides toward the cylinders, the boxes being removably secured to the crank case and the cylinders, a fan including a rotor mounted on the crank shaft of the engine to rotate therewith, a housing around the rotor, conduits connecting opposite sides of the housing and the boxes respectively, the housing including means for equally distributing the air currents to the conduits at diametrically opposite points relatively to the rotor.

CARL T. DOMAN.
FRANCIS C. SAVAGE.